United States Patent [19]

Chwalek et al.

[11] 4,181,748

[45] Jan. 1, 1980

[54] COMBINED DRY-WET MILLING PROCESS FOR REFINING CORN

[75] Inventors: Vincent P. Chwalek, Los Angeles, Calif.; Richard M. Olson, North Riverside, Ill.

[73] Assignee: CPC International Inc., Englewood Cliffs, N.J.

[21] Appl. No.: 904,838

[22] Filed: May 11, 1978

[51] Int. Cl.² .............................................. A23K 1/00
[52] U.S. Cl. .................................... 426/623; 127/68; 426/630; 426/635
[58] Field of Search ........ 426/623, 630, 635, 481–483; 127/68, 67

[56] References Cited

U.S. PATENT DOCUMENTS

| | | | |
|---|---|---|---|
| 2,186,303 | 1/1940 | McCoy | 127/68 |
| 3,070,447 | 12/1962 | Webster | 426/481 |
| 3,595,696 | 7/1971 | Vegter | 127/68 |
| 3,857,987 | 12/1974 | Rogols et al. | 426/481 |
| 3,909,288 | 9/1975 | Powell et al. | 426/635 |

*Primary Examiner*—R. B. Penland
*Attorney, Agent, or Firm*—Stanley M. Parmerter

[57] ABSTRACT

A continuous process for refining whole grain corn to obtain a prime corn starch fraction, an animal feed product and, optionally, corn oil. The process comprises dry milling corn kernels to provide an endosperm fraction, a germ fraction, a fiber (hull) fraction and a cleanings fraction, wet milling the endosperm fraction including using two distinct steeping steps, one upstream and the other downstream of an impact milling step, to provide a mill starch slurry. The process further comprises removing fine fiber tailings from the mill starch slurry, separating the slurry into a starch-rich fraction and protein-rich fraction, concentrating the protein-rich fraction, directly combining the fiber (hull), cleanings, fine fiber tailings and protein-rich concentrate without removing corn oil therefrom, with the germ fraction to provide a wet animal feed product, and drying the feed product. Optionally, corn oil is recovered from the germ fraction only.

16 Claims, 5 Drawing Figures

COMBINED DRY-WET MILLING PROCESS FOR REFINING CORN

BACKGROUND OF THE INVENTION

This invention relates to a process for the refining of corn based on the combined use of dry milling and wet milling procedures, and using a unique wet milling sequence, to obtain a high quality corn starch product, an animal feed product and, if desired, corn oil also. The corn oil, when produced, is obtained solely from the dry milled corn germ and not from any other dry or wet milled corn constituents, in contrast to what is generally done in the prior art.

Many present day methods for refining corn to produce corn starch are based on the use of wet milling whole grain corn to separate the hull and germ from the endosperm (corn grits), followed by the recovery of prime corn starch from the endosperm. In general, these methods involve steeping the whole corn kernel in an acidic medium, e.g., sulfurous acid, passing the acid-soaked grain through degerminating mills, germ separators, grinding mills, washing screens, and the like to separate the germ and hull from the endosperm, and further refining the endosperm to obtain a corn starch. The recovered corn starch can be used as such, roasted to form dextrin or refined still further into corn syrup, dextrose sugar and other food sweeteners. In addition, corn oil and animal feeds can be produced during the refining of the corn kernel.

Despite the variety of products which can be obtained, processes based entirely on the use of wet milling are disadvantageous because long steeping times, large amounts of process water and expensive wet milling equipment such as germ dryers and hull dewatering presses, are required.

In Powell et al, U.S. Pat. No. 3,909,288, assigned to American Maize Company, there is proposed a process for refining corn using both wet milling and dry milling procedures in combination. In this process, whole corn kernels are first dry milled to separate the hulls and the corn germ from one or more fractions of the endosperm, at least some of the endosperm fractions are then steeped in a single steeping step and further treated to provide a corn starch fraction and a wet corn gluten fraction. The wet corn gluten is thereafter dried in a separate station, combined with the corn germ and preferably other corn constituents as well, such as corn flour, hulls and fine fiber tailings, and the composite is extracted to remove corn oil.

The process of U.S. Pat. No. 3,909,288 is disclosed as doing away with the need for wet milling equipment, including germ dryers and hull dewatering presses, as well as resulting in shorter steeping times (Col. 1, lines 35–41). It is further disclosed that the steeping times can be still further reduced by grinding the dry milled endosperm particles to decrease the particle size (Col. 3, lines 50–67).

The process of U.S. Pat. No. 3,909,288 is not entirely satisfactory, however, because of the large number of equipment stations required, such as the steepwater evaporation and separate corn gluten drying stations. Moreover, it has been found that the grinding of dry milled endosperm particles to reduce their particle size, as is taught in the patent, often causes fractures to form in many of the starch granules contained in the endosperm matrix. As a result, the broken starch granules swell during subsequent steeping and fail to separate at the same rate as unbroken granules, which adversely affects the starch yield. In addition, corn oil must be extracted from other corn constituents, besides the corn germ, in order for the process of the patent to be economically viable, the patentees pointing out at Col. 5, lines 31–33 that for acceptable commercial operation it is necessary to subject at least the germ stream and the dried corn gluten stream to the solvent extraction step.

OBJECTS OF THE INVENTION

It is an object of this invention to provide a new combined dry-wet milling process for refining corn to produce corn starch, animal feed and optionally corn oil, which has a number of advantages over the method disclosed in U.S. Pat. No. 3,909,288.

A further object of this invention is to provide a process which permits the elimination of separate steepwater evaporation and corn gluten drying stations, thus resulting in a savings in labor and equipment costs.

A still further object of this invention is to provide a unique split-steeping and particle size reduction procedure which protects the starch granules contained in the endosperm matrix from fracture so as to avoid losses in the starch which often occurs when endosperm particles are dry ground as taught in U.S. Pat. No. 3,909,288.

A still further object of this invention is to provide a novel process for obtaining corn oil whereby the oil is removed from the germ alone, and not from any other corn constituents as in the case of the method of U.S. Pat. No. 3,909,288, such process of the invention being commercially acceptable because of the aforementioned cost savings in labor and equipment.

It has been found that the objects of this invention are realized by providing a corn refining process which is now generally described.

DESCRIPTION OF THE INVENTION

According to this invention in its broadest aspects, there is provided a corn refining process, comprising:
(A) dry milling whole grain corn to provide
  (a) an endosperm fraction,
  (b) a germ fraction,
  (c) a fiber (hull) fraction, and
  (d) a cleanings fraction;
(B) wet milling the endosperm fraction of (A)(a) by sequentially
  (i) steeping the endosperm fraction,
  (ii) separating the larger wet endosperm particles from the smaller wet endosperm particles,
  (iii) milling the larger wet endosperm particles to reduce their particle size,
  (iv) recombining the wet endosperm particles of (ii) and (iii) into a single fraction, and
  (v) steeping the endosperm fraction again to provide a mill starch slurry;
(C) separating fine fiber tailings from the mill starch slurry of (B)(v);
(D) separating the defibered mill starch slurry of (C) into a starch-rich fraction and a protein-rich fraction;
(E) concentrating the protein-rich fraction of (D);
(F) directly combining each of the fiber (hull) fraction and the cleanings fraction of (A), the fine fiber tailings fraction of (C) and the protein-rich concentrate of (E) without removing any corn oil therefrom, with the germ fraction of (A) to provide a wet animal feed product; and (G) drying the wet feed product of (E) to obtain a final animal feed product.

In a preferred embodiment, corn oil is separated from the dry milled corn germ fraction prior to its combination with other corn constituents to form an animal feed product.

The term "dry milling" is used herein in its conventional sense to mean milling the whole corn kernel in substantially the dry state, without presoaking the grain, to separate the kernel into its major constituents, e.g., fiber (hull), germ and endosperm (grits), as well as corn cleanings in minor proportions.

By way of illustration, the process of this invention is carried out as follows:

Dry whole corn kernels are first cleaned to remove chaff and other external vegetable matter. The cleanings are later used in the preparation of an animal feed product. The hulls of the cleaned, dry corn kernels are intentionally partially broken to facilitate subsequent milling, and passed through an impact degerminating mill to loosen up the corn germ. The discharge from the degerminating mill, comprising corn germ, fiber (hull) and endosperm, is sifted into fractions according to particle size. The sifted fractions are subjected to suction using air aspirators, which separates the hull fiber. This fiber is another constituent which is used ultimately in the formation of the animal feed product. The dehulled discharge from the air aspirators, comprising corn germ and endosperm, is passed over vibrating gravity tables to separate the corn germ from the endosperm. The germ is collected from the gravity tables and, if desired, sent to a corn oil expelling station. This completes the dry milling step of the process.

A dry milled endosperm fraction is next subjected to a wet milling procedure. In this procedure, the particles of the endosperm fraction are first steeped, then the larger soaked particles are separated from the smaller soaked endosperm particles, selectively milled while still in the wet state to reduce their particle size and recombined with the smaller, unmilled endosperm particles. The combined particles are then subjected to a second steeping step. The residence time of the particles in each of the two steeping steps can vary. In general, however, the total residence time of the endosperm particles in the two steeping steps combined is preferably in the range of from about 2 to about 6 hours.

Preferably, the first steeping step is conducted for a period of about one-half hour. The steeping medium in which the endosperm particles are soaked comprises an aqueous solution of an acid, e.g., sulfurous, or a base, e.g., sodium hydroxide. If sulfurous acid is used, an initial concentration of from about 300 to about 1000 ppm of $SO_2$ in water is preferred. If an aqueous solution of sodium hydroxide is used, the solution is preferably adjusted to an initial pH of from about 9.5 to about 11.0. It is to be understood that as the endosperm particles remain in the steeping medium, the sulfur dioxide concentration or pH may undergo change. Accordingly, additional amounts of acid or base may be added to adjust the steeping medium to the desired value during either of the two steeping steps. After the first steeping step is completed, the endosperm particles preferably possess a water content of from about 40 to about 45% by weight, wet solids basis, preferably having released from about 6 to about 7.5% by weight of their dry substance as solubles into the process (steep) water.

The steeped endosperm particles are then passed through a sieve or screen of suitable pore size such that the larger particles, e.g., more than about 50–75 microns in diameter, are retained on the screen and the smaller particles, e.g., about 50–75 microns or less, pass through. The larger particles are collected and milled while wet, preferably in an impact mill, to reduce their particle size to about that of the smaller particles, e.g., 50–75 microns or less.

The milled particles are recombined with the smaller particles and process water bypassed around the mill, and the composite is next subjected to the second steeping step. It is advantageous to employ elevated temperatures, e.g., about 90° to 145° F., for both steeping steps and to maintain the endosperm particles in suspension in the process water by suitable means, such as by agitation or recirculation of the slurry. This completes the wet milling portion of the process. A mill starch slurry of endosperm particles in process (steep) water, normally having a specific gravity of from about 7° to about 9° Baumé, is thus obtained.

The mill starch slurry from the wet milling step is then treated to separate and recover any fine corn fibers which may still remain. This is done conveniently by passing the slurry through a sieve or screening device having a pore size of about 37 to 660 microns. The clean-up tailings which are retained on the screen, comprising a wet mixture of fine corn fiber and a minor proportion of endosperm agglomerates, are used as another component in the animal feed product. The filtrate from the sieve, still in the form of a mill starch slurry, is then treated to separate and recover corn starch. Suitable separation systems include an all DorrClone system, such as is disclosed in copending application Ser. No. 734,683, filed Oct. 22, 1976 now U.S. Pat. No. 4,144,087; systems comprising centrifuges for starch separation and hydroclones for starch washing; and systems comprising centrifuges for both starch separation and starch washing. Preferably the separating system comprises two or more hydroclones, connected in multistage countercurrent arrangement, e.g., the aforementioned all DorrClone system.

The hydroclone, or liquid cyclone, is a cone-shaped tubular device into which the mill starch slurry is forced under pressure. The inlet orifice angle and aperture size are selected to produce a rotational velocity of the feed material which is sufficient to result in a separation of the particles according to differences in particle size and settling rates. Thus, a heavier, starch-rich fraction is collected as an underflow stream, and a lighter, protein-rich fraction, which contains corn gluten, is collected as an overflow stream. The starch-rich fraction is dried to yield a prime, high quality corn starch product.

The protein-rich fraction is collected and concentrated, preferably in a centrifuge, and then combined with the dry milled hull (fiber), cleanings and germ fractions and the wet fine fiber clean-up tailings, to form a wet animal feed product. The wet feed product is ultimately dried in a heated enclosure to produce the final feed product.

Optionally and preferably, the dry milled corn germ fraction alone is treated to remove corn oil, prior to its combination with the other components of the animal feed. Preferably, the majority of the oil is recovered by the use of mechanical expulsion means. After the oil has been removed, the resulting dry germ cake, or germ meal, is included in the wet animal feed composite, and the composite is dried as described above.

DETAILED DESCRIPTION OF THE DRAWINGS

The process of this invention is further illustrated by the following detailed description, with reference to the accompanying drawings.

Figure 1:
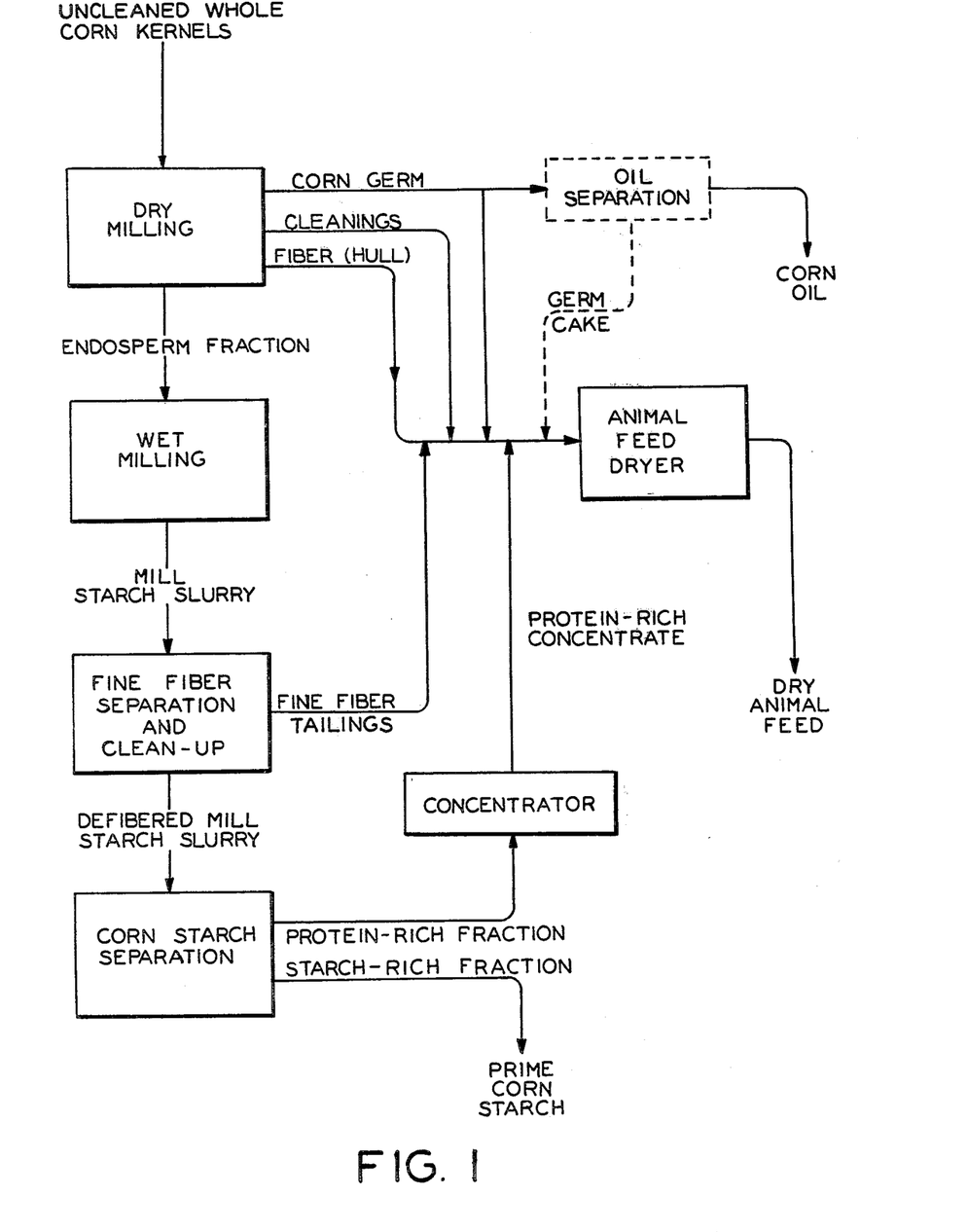
FIG. 1 is a schematic block diagram showing a complete process according to this invention, with optional germ oil separating step indicated by dotted lines.

With reference to FIG. 1, dry, uncleaned whole grain corn is conveyed to a dry milling station where it is screened to remove large and small pieces of chaff and other admixed vegetable matter and is further processed to separate the fiber (hull) and corn germ from the endosperm (grits). A dry milled endosperm fraction is wet milled to form a mill starch slurry, from which fine corn fiber tailings are then separated, and the defibered mill starch slurry is thereafter treated to provide a protein-rich fraction and a separate starch-rich fraction. The protein-rich fraction, containing corn gluten, is then concentrated. The cleanings, fiber (hull) and corn germ (or germ cake, if oil has been separated from the germ) from the dry milling step, the wet fine fiber tailings and the wet protein-rich concentrate are all combined and dried to form a final animal feed product.

Figure 2:
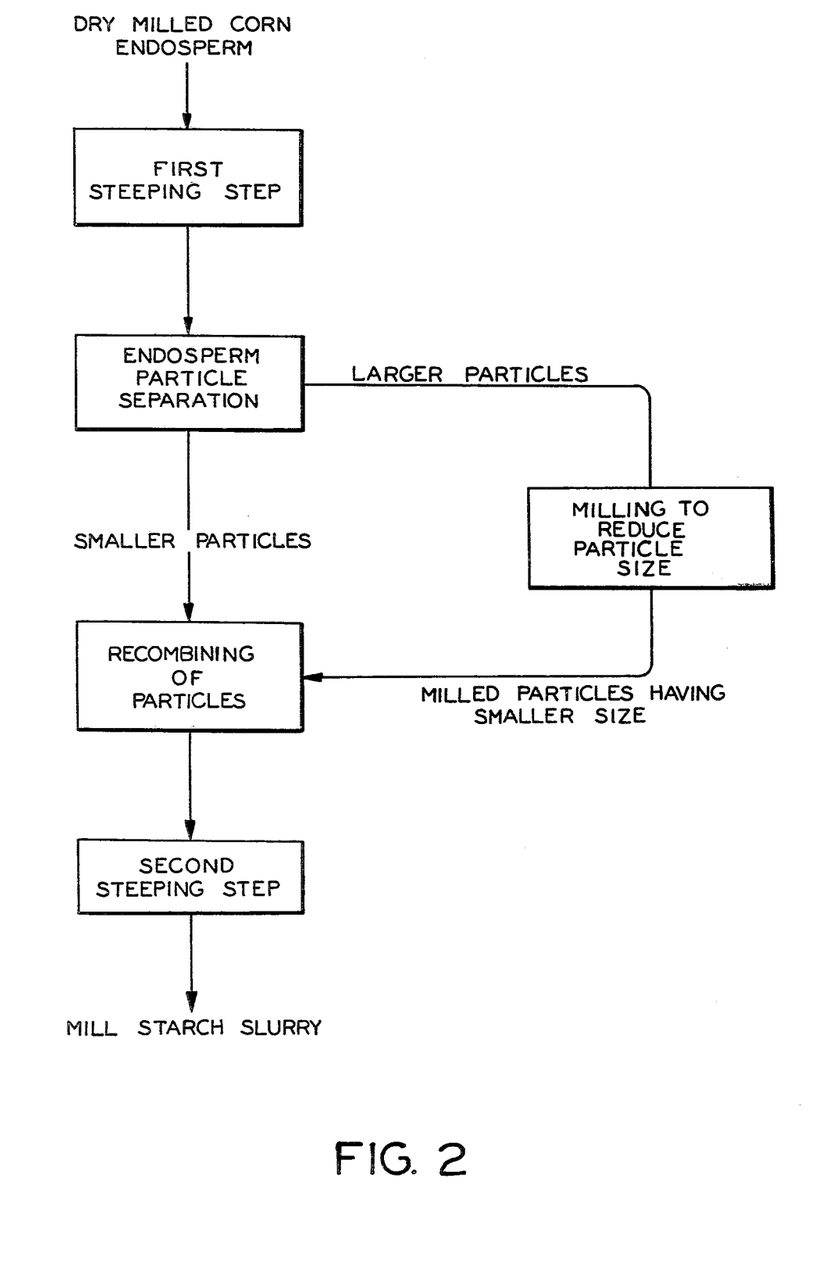
FIG. 2 is a schematic block diagram of a preferred procedure for carrying out the wet milling step of the process.

With reference to FIG. 2, in the wet milling step the endosperm fraction from the dry milling step is, in sequence, steeped, the larger soaked endosperm particles are separated and milled while still wet to reduce the particle size, the milled endosperm particles are combined with the unmilled endosperm particles, and the combined endosperm fraction is steeped again to form a mill starch slurry.

Figure 3:
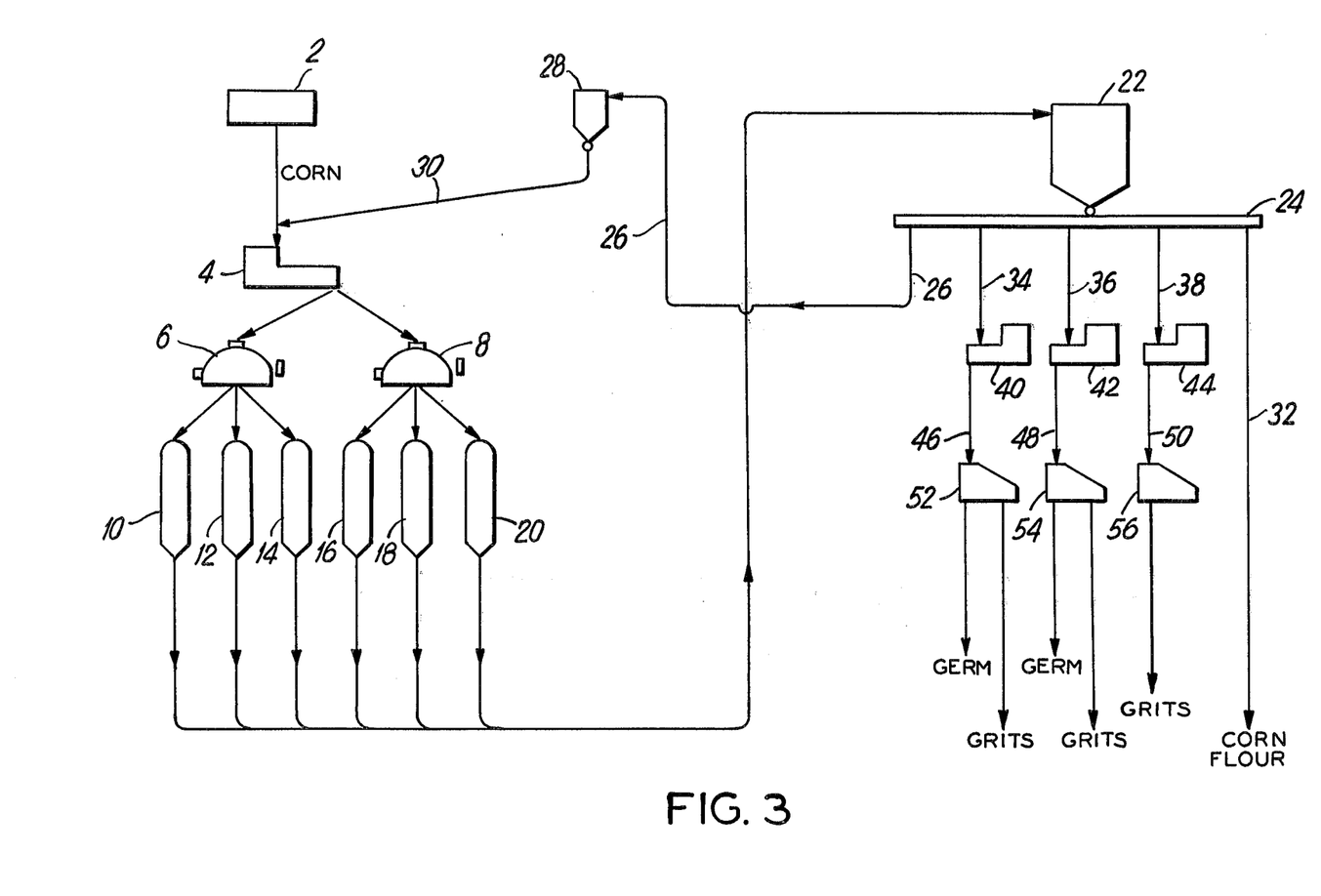
FIG. 3 is a flow diagram showing, in detail, the dry milling step of the process.

With reference to FIG. 3, whole corn kernels are weighed at weighing station 2, and distributed from continuous belt feeder 4 to pre-break rollers 6 and 8, where the hulls of the kernels are partially broken open. The corn kernels from pre-break rollers 6 and 8 are sent to impact degerminating mills 10, 12, 14, 16, 18 and 20, e.g., Buhler-Miag, Inc. Model No. MHXA, or equivalent, where the corn germ is loosened. The discharge from the degerminating mills is fed into hopper 22 and from there, is sifted through sifter 24, e.g., Model MPAD, commercially available from Buhler-Miag, Inc., or equivalent. The coarsest stream, 26, is sent to hopper 28 and recycled back through the degerminating mills. The finest stream, 32, comprising corn flour, is collected from sifter 24 for wet milling. Intermediate streams 34, 36 and 38 are passed through air aspirators 40, 42 and 44, respectively, Buhler-Miag, Inc.'s Model MVSA, where the coarse corn fiber (hull) is separated from the degerminated endosperm and collected for later use in the preparation of an animal feed product.

Endosperm streams 46, 48 and 50, from air aspirators 40, 42 and 44, are passed over vibrating gravity tables 52, 54 and 56, respectively, e.g., Model No. 40V, sold by Forsbergs, Inc., to separate the corn germ from the endosperm. The germ streams are collected and combined and, if desired, sent to an oil separating station where corn oil is removed. From there, the resulting germ cake goes to animal feed production station. If oil is not removed, the germ is sent directly from the gravity tables to the animal feed production station.

The endosperm (grits) streams from vibrating gravity tables 52, 54 and 56, are collected and combined with corn flour stream 32, to form a composite endosperm fraction, which represents about 85% by weight of the original corn dry substance, exclusive of corn cleanings.

Figure 4:
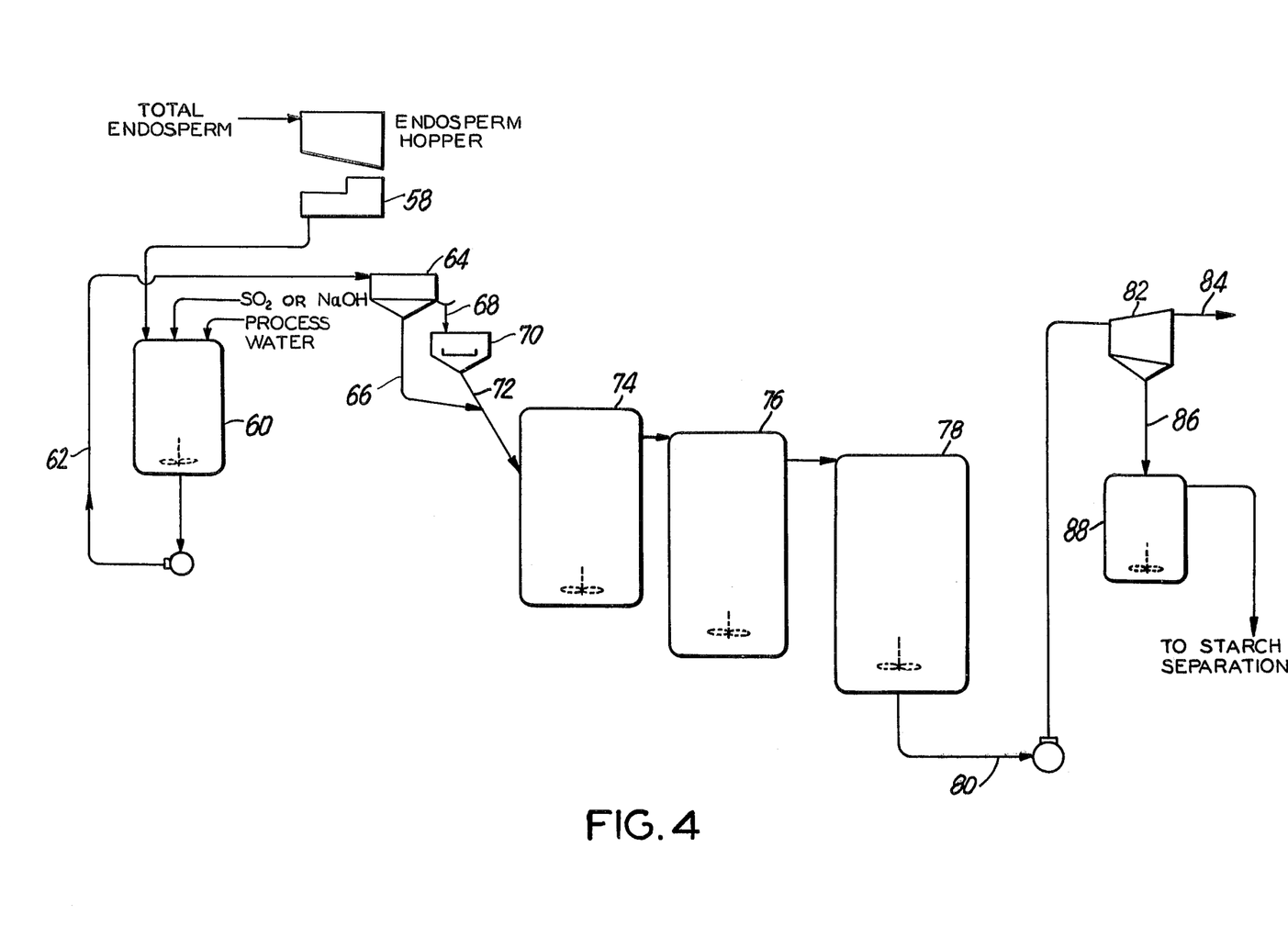
FIG. 4 is a flow diagram showing, in detail, the wet milling and fine fiber separating steps of the process.

With reference to FIG. 4, the fraction from the dry milling step is measured from scale meter 58, into steep tank 60, where the dry endosperm particles are mixed with water and an acid, e.g., sulfur dioxide gas, or caustic, e.g., sodium hydroxide. Preferably, a weight ratio of process water to endosperm solids in the range of from about 6:1 to about 7:1 is used. An amount of sulfur dioxide, or sodium hydroxide, is dissolved in the water which is sufficient to provide an initial sulfur dioxide concentration of from about 300 to about 1000 parts per million (ppm), based on the water phase, or in the case of sodium hydroxide, an initial pH of from about 9.5 to about 11.0. During this first steeping step, the process water is preferably maintained at an elevated temperature above room temperature, e.g., from about 90° to about 145° F., especially preferably about 130° F. Vigorous agitation is applied to keep the insoluble corn solids in suspension during steeping. In general, about one-half hour of steeping time is sufficient, but slightly longer retention times can be used, e.g., about 1–2 hours.

After the first steeping step is completed, the soaked endosperm particles are pumped from steep tank 60, through centrifugal paddle screen 64, e.g., Indiana Canning Machine Co., Model No. 77, or equivalent, preferably having a pore size of about 50 to 75 microns. Filtrate stream 66, comprising process water and undersize particles, i.e., about 50–75 microns or less, passes through while oversize particles 68, i.e., greater than about 50–75 microns, are retained on the screen. Oversize particles 68, collected from screen 64, are milled in impact mill 70, e.g., a 40-inch Entoleter impact mill, preferably operated at speeds of about 3100 revolutions per minute (rpm), to reduce their particle size to no greater than about 50–75 microns.

Filtrate stream 66, which is bypassed around impact mill 70 along with the major portion of the process water, and impact mill discharge stream 72, are both combined and sent to steep tanks 74, 76 and 78 for the second steeping step of the wet milling procedure. Steep tanks 74, 76 and 78 are preferably equipped with agitators and connected in series by overflow. The endosperm particles and process water are maintained in suspension in the steep tank, using agitation, for a period of about 4 hours. As in the case of the first steeping step, the temperature is maintained in the range from about 90° to about 145° F. This can be done conveniently by recirculating the process water through heat exchangers connected to the steep tanks. If necessary, suitable amounts of sulfur dioxide, or sodium hydroxide, can be added to adjust the $SO_2$ concentration or pH to the desired value.

After the second steeping step is completed, the endosperm fraction, in the form of a mill starch slurry of endosperm particles and process water, 80, is removed from the steep tanks and passed through fine fiber separating and clean-up screen 82, for removal of fine corn fiber tailings from the slurry. A screen pore size of from about 37 to about 660 microns is preferred. Wet fine fiber clean-up tailings 84 are collected for inclusion in the animal feed product. The remaining endosperm particles, still in the form of a mill starch slurry, 86, pass through screen 82 and are collected in mill starch hold tank 88.

Figure 5:
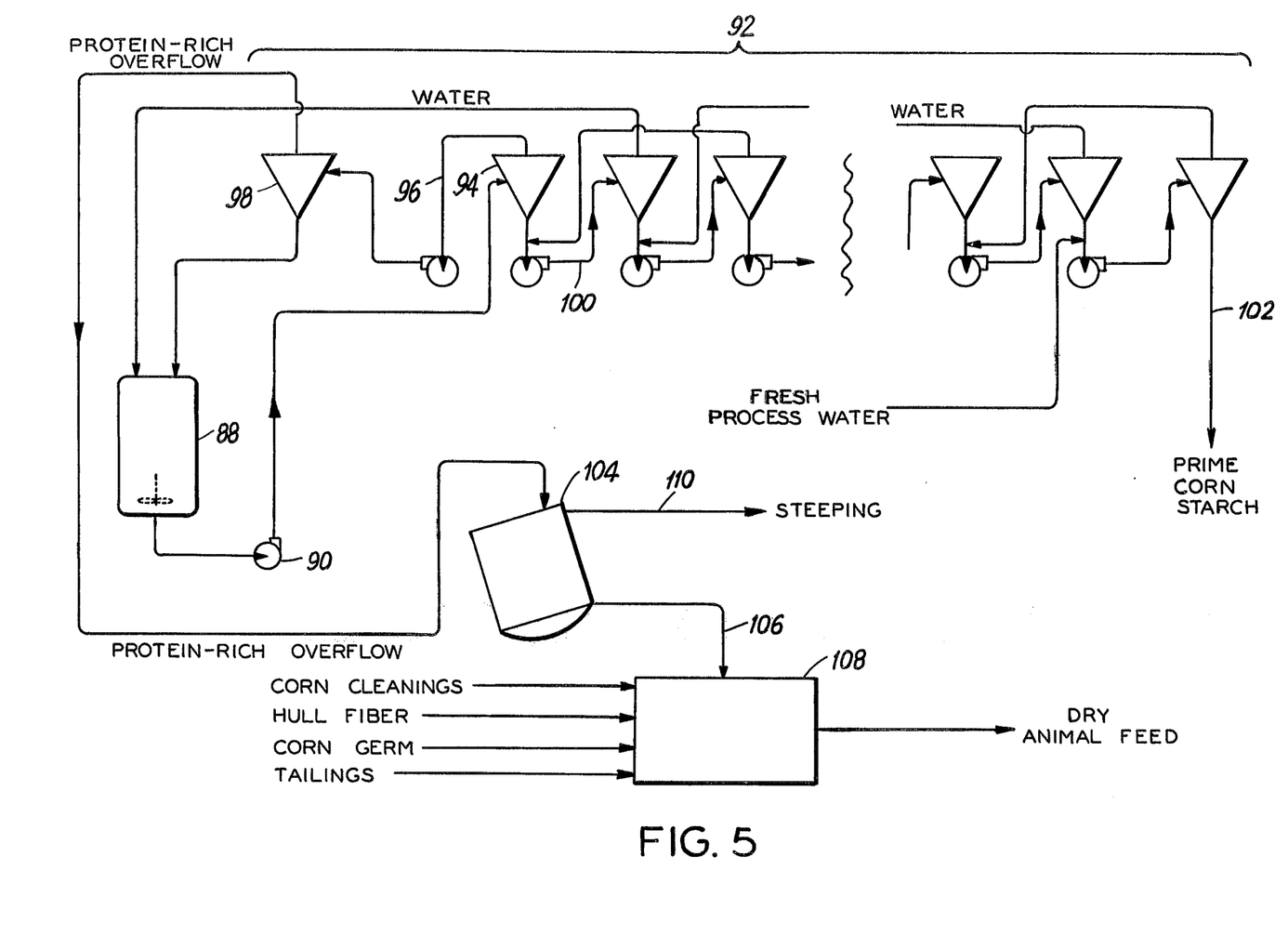
FIG. 5 is a flow diagram showing, in detail, the corn starch separating, protein fraction concentrating and animal feed production steps.

With reference to FIG. 5, the mill starch slurry from mill starch tank 88, having a specific gravity of from about 7° to about 9° Baumé, is pumped through pump 90 into hydroclone separating system 92. Hydroclone system 92 preferably comprises a plurality, e.g., from about 10 to about 14 stages of 10-millimeter internal diameter DorrClone units, Dorr-Oliver Co. The mill starch slurry is first directed through hydroclone stage 94. Overflow 96, from hydroclone stage 94, which comprises a protein-rich stream containing corn gluten, is pumped through hydroclone unit 98. The overflow from hydroclone unit 98, comprising a still further protein-enriched stream, is collected for concentrating.

Underflow 100 from hydroclone stage 94, comprising a corn starch-enriched stream, is directed through the rest of the hydroclone units in hydroclone system 92 in turn, whereby an increasingly starch-enriched underflow is obtained from each further unit in succession. Ultimately, starch-rich fraction 102, comprising prime corn starch, is collected. Fresh process water, which is fed countercurrently back through hydroclone system 92, represents the only fresh water input to the entire process.

With further reference to FIG. 5, the protein-rich overflow from hydroclone unit 98, is sent to concentrating station 104, comprising a MERCO BH-30 centrifuge, or equivalent. Underflow 106, comprising a wet protein-rich concentrate, is sent to animal feed dryer 108, where it is combined with the corn cleanings, fiber (hull), germ and fine fiber tailings fractions previously collected during the process. Overflow 110, comprising used process water containing only a minor amount of corn insolubles, is recycled back to the process for further use in steeping.

The end products of the process as just described, are a prime corn starch fraction, an animal feed product and optionally, corn oil.

Because the process is continuous instead of batchwise, inventories within the system are reduced and the entire operation can be quickly started or stopped at any point. It is also noteworthy that the process permits the avoidance of a separate steepwater evaporation step, as well as a hull fiber dewatering station and a corn gluten dewatering and drying station. These are, on the other hand, required in conventional processes, such as that of U.S. Pat. No. 3,909,288.

The process of this invention is further illustrated in the following examples.

EXAMPLE 1

One-hundred and two pounds of uncleaned dry corn kernels, containing from about 14 to about 16% by weight of innate moisture, are passed through a sieve having a pore size of $-\frac{1}{2}$ inch $\times \frac{5}{8}$ inch oval and $+3/32$ inch, and substantially all of the chaff and other vegetable matter in external admixture with the kernels is thus separated from the kernels. After cleaning, the dried corn kernels are carried on a conveyor belt through a pre-break roller, Model No. ZWMB, Buhler-Miag, Inc., whereby substantially all of the hulls are broken and the interiors of the kernel are exposed.

The fractured kernels are then passed through a Buhler-Miag impact degerminating mill, Model No. MHXA, and the discharge from the mill is sifted into five separate streams, the coarsest of which is recycled through the impact degerminating mill and the finest of which is collected immediately for wet milling. The three streams of intermediate particle size are passed through an air aspirator, Buhler-Miag's Model No. MVSA to separate the coarse corn fiber, and the residue from the air aspirator from which the coarse fiber has been removed is passed over a vibrating gravity table, Forsbergs, Inc.'s Model No. 40V, to separate the corn germ from the corn grits or endosperm. The corn grits are then collected for wet milling.

A total of 16.83 pounds of fiber (hull) and corn germ, combined, and 85.17 pounds of endosperm are thus obtained. The endosperm fraction has the following composition:

| DRY SUBSTANCE | PERCENT BY WEIGHT |
|---|---|
| Starch | 83.0 |
| Protein | 8.7 |
| Fat | 1.8 |
| Fiber (Hull) | 0.8 |
| Other | 5.7 |
| | 100 TOTAL |

The dry milled endosperm fraction is immersed in a tank of aqueous sulfurous acid, having a concentration of about 1000 ppm of sulfur dioxide, at a temperature of about 90°–145° F., with vigorous agitation for a period of one-half hour. After this period, the soaked corn kernels and process water are pumped from the tank through a screen, Model No. 77, ICM Co., having a pore size of about 50 microns. The larger endosperm particles, greater than about 50 microns, are retained on the screen. The retained particles are milled on an Entoleter impact mill, having an internal diameter of about 40 inches, operated at a speed of 3100 rpm. The particle size of the endosperm particles is thus reduced to about 50 microns or less. The milled particles are recombined with the filtrate from the screen, which comprises sub 50-micron particles and process water bypassed around the mill, and the recombined endosperm fraction and process water are placed in a second steep tank where the mixture is maintained at a temperature of about 90°–145° F., for about four hours, with vigorous agitation.

A suspension of insoluble corn endosperm particles, comprising a mill starch slurry having a specific gravity of 8° Baumé, is recovered from the second steep tank and passed through a Starcossa centrifugal screen, equipped with a cloth having a pore size of about 37 microns. Fine corn fiber tailings and a minor proportion of endosperm agglomerates are retained on the sieve and collected, while the remainder of the slurry passes through. The portion of the mill starch slurry which has passed through the centrifuge screen is directed through a series of 11 stages of DorrClone hydroclone units, 10-mm internal diameter hydroclones, available from Dorr-Oliver Co. These are connected in countercurrent arrangement. A protein-rich overflow stream, which contains corn gluten, and a starch-rich underflow stream, which contains prime corn starch, are taken off from the hydroclone system. The protein-rich stream is concentrated in a MERCO BH-30 centrifuge and a protein-rich concentrate is obtained.

The protein-rich concentrate from the BH-30 centrifuge, still in the wet state, is combined with the dry milled corn cleanings fraction, the dry milled corn germ fraction, the dry milled fiber (hull) fraction and the wet fine fiber clean-up tailings collected from the Starcossa centrifugal screen, to form a wet animal feed product. The wet feed product is dried in an oven at 215° F. for about 4 hours, forming a final animal feed product.

A yield of 65.6 pounds of prime corn starch, or 64.2% by weight, and 36.4 pounds of animal feed, or 35.7% by weight is obtained.

EXAMPLE 2

The process of Example 1 is repeated, except that the dry milled corn germ is first treated to remove corn oil prior to being combined with the other constituents of the animal feed product. This is done by placing the corn germ particles in a press, Laboratory Model No. 17100, Fred S. Carver, Inc., or V. D. Anderson Model No. N 3334 Screw Expeller Press, and applying pressure to mechanically expel substantially all of the germ oil. The resulting germ cake is then combined with the dry milled fiber (hull) fraction, the dry milled corn cleanings fraction, the wet protein-rich concentrate and the wet fine fiber clean-up tailings to form a wet animal feed product which is thereafter dried as above.

A yield of 2.0 pounds of corn oil, or about 2% by weight, 36.0 pounds of animal feed, or 35.3% by weight and 64.0 pounds of prime starch, or 62.7% by weight, is thus obtained.

Other modifications and variations of the process of this invention will suggest themselves from the above description. It is to be understood, therefore, that changes may be made in the embodiments shown without departing from the scope of the invention as defined in the appended claims.

We claim:
1. A continuous corn refining process, which comprises:
   (A) dry milling whole grain corn to provide
      (a) an endosperm fraction,
      (b) a germ fraction,
      (c) a fiber (hull) fraction, and
      (d) a cleanings fraction;
   (B) wet milling the endosperm fraction of (A)(a) by sequentially
      (i) steeping the endosperm fraction,
      (ii) separating the larger wet endosperm particles from the smaller wet endosperm particles,
      (iii) milling the larger wet endosperm particles to reduce their particle size,
      (iv) recombining the wet endosperm particles of (ii) and (iii) into a single fraction, and
      (v) steeping the endosperm fraction again to provide a mill starch slurry;
   (C) separating fine fiber tailings from the mill starch slurry of (B)(v);
   (D) separating the defibered mill starch slurry of (C) into a starch-rich fraction and a protein-rich fraction;
   (E) concentrating the protein-rich fraction of (D);
   (F) directly combining each of the fiber (hull) fraction and the cleanings fractions of (A), the fine fiber tailings fraction of (C) and the protein-rich concentrate of (E) without removing any corn oil therefrom, with the germ fraction of (A) to provide a wet animal feed product; and
   (G) drying the wet feed product of (F) to obtain a final animal feed product.

2. The process of claim 1 wherein corn oil is separated from the corn germ fraction of (A).

3. The process of claim 1 wherein corn oil is not separated from the corn germ fraction of (A).

4. The process of claim 1 wherein in wet milling step (B), the initial weight ratio of the process (steep) water to the endosperm particles is in the range of from about 6:1 to about 7:1.

5. The process of claim 1 wherein the first steeping step (B)(i) and the second steeping step (B)(v) are conducted in an aqueous medium at an acid or alkaline pH.

6. The process of claim 5 wherein the steeping medium is acidic.

7. The process of claim 6 wherein the steeping medium comprises a solution of sulfur dioxide in water.

8. The process of claim 5 wherein the steeping medium is alkaline.

9. The process of claim 8 wherein the steeping medium comprises a solution of sodium hydroxide in water.

10. The process of claim 1 wherein the total residence time of the endosperm particles in steeping steps (B)(i) and (B)(v) is in the range of from about 2 to about 6 hours.

11. The process of claim 1 wherein in milling step (B)(iii) endosperm particles having a size of greater than about 50 to about 75 microns are reduced in size to about 50 to about 75 microns or less.

12. The process of claim 1 wherein step (D) is conducted by passing the mill starch slurry through a plurality of hydroclones.

13. The process of claim 12 wherein the mill starch slurry has a specific gravity of from about 7° to about 9° Baumé.

14. A continuous corn refining process, which comprises:
   (A) dry milling whole grain corn to provide
      (a) an endosperm fraction,
      (b) a germ fraction,
      (c) a fiber (hull) fraction, and
      (d) a cleanings fraction;
   (B) wet milling the endosperm fraction of (A)(a) by sequentially
      (i) steeping the endosperm fraction in a solution of sulfur dioxide in water, the initial weight ratio of the process (steep) water to the endosperm particles being in the range of from about 6:1 to about 7:1,
      (ii) separating the wet endosperm particles having a size of greater than about 50 microns from the smaller wet endosperm particles,
      (iii) impact milling the wet endosperm particles having a size of greater than about 50 microns to reduce their particle size to about 50 microns or less,
      (iv) recombining the wet endosperm particles of (ii) and (iii) into a single fraction, and
      (v) steeping the endosperm fraction again in a solution of sulfur dioxide in water to provide a mill starch slurry, the total residence time of steeping steps (i) and (v) combined being in the range from about 2 to about 6 hours;
   (C) separating the fine corn fiber tailings from the mill starch slurry of (B)(v);

(D) passing the defibered mill starch slurry of (C), having a specific gravity of from about 7° to about 9° Baumé, through a plurality of hydroclones to provide an underflow stream comprising a starch-rich fraction and an overflow stream comprising a protein-rich fraction;

(E) concentrating the protein-rich fraction of (D);

(F) directly combining each of the fiber (hull) fraction and the cleanings fraction of (A), the fine fiber tailings fraction of (C) and the protein-rich concentrate of (E) without removing any corn oil therefrom, with the germ fraction of (A) to provide a wet animal feed product; and (G) drying the wet feed product of (F) to obtain a final feed product.

15. The process of claim 14 wherein corn oil is separated from the germ fraction of (A).

16. The process of claim 14 wherein corn oil is not separated from the germ fraction of (A).

* * * * *